(12) United States Patent
Cabanaw

(10) Patent No.: US 6,906,279 B2
(45) Date of Patent: **\*Jun. 14, 2005**

(54) RESISTANCE WELDING FASTENER ELECTRODE

(75) Inventor: Daniel Martin Cabanaw, Essex (CA)

(73) Assignee: Doben Limited, Windsor (CA)

( * ) Notice: Subject to any disclaimer, the term of this patent is extended or adjusted under 35 U.S.C. 154(b) by 39 days.

This patent is subject to a terminal disclaimer.

(21) Appl. No.: 10/360,237

(22) Filed: Feb. 6, 2003

(65) Prior Publication Data

US 2003/0141341 A1 Jul. 31, 2003

Related U.S. Application Data

(63) Continuation of application No. 09/902,378, filed on Jul. 10, 2001, now Pat. No. 6,576,859.

(51) Int. Cl.$^7$ .................................................. B23K 9/24
(52) U.S. Cl. ........................ 219/119; 219/117.1; 219/93
(58) Field of Search ........................... 219/117.1, 117, 219/86.41, 93, 109, 119

(56) References Cited

U.S. PATENT DOCUMENTS

| | | |
|---|---|---|
| 2,623,974 A | 12/1952 | Prucha |
| 2,731,535 A | 1/1956 | Grey |
| 3,657,509 A | 4/1972 | Beneteau |
| 4,020,316 A | 4/1977 | Schaft et al. |
| 4,609,805 A | 9/1986 | Tobita et al. |
| 4,789,768 A | 12/1988 | Tobita et al. |
| 5,248,869 A | 9/1993 | DeBell et al. |
| 5,393,950 A | 2/1995 | Killian |
| 5,632,912 A | 5/1997 | Cecil |
| 5,705,784 A | 1/1998 | Aoyama et al. |
| 5,808,266 A | 9/1998 | Cecil |
| 6,020,569 A | 2/2000 | Cecil et al. |
| 6,043,449 A | 3/2000 | Kanjo |
| 6,067,696 A | 5/2000 | Cecil et al. |
| 6,184,487 B1 | 2/2001 | Visscher |
| 6,232,572 B1 | 5/2001 | Kanjo |
| 6,274,840 B1 | 8/2001 | Kanjo |

FOREIGN PATENT DOCUMENTS

WO  WO 88/00104  1/1988

OTHER PUBLICATIONS

Search Report PCT/CA02/00857; Filed Jun. 12, 2002.

*Primary Examiner*—Kiley S. Stoner
*Assistant Examiner*—Len Tran
(74) *Attorney, Agent, or Firm*—Carlson, Gaskey & Olds, PC

(57) ABSTRACT

A welding assembly is provided for welding a fastener to an object such as a vehicle body panel. The assembly includes a weld gun having first and second electrodes movable relative to one another between an open position and a closed position. The first electrode includes a housing assembly. A pin is received in the housing assembly and is movable when in said closed position between a desired nut position, and upside down nut position, and a no nut position. An optical sensor has a terminal end space from the pin for direction light thereon. The terminal end of the sensor received reflected light from the pin. A sensor control system processes the reflected light into a signal corresponding to one of the desired nut, upside down nut, and no nut positions.

12 Claims, 4 Drawing Sheets

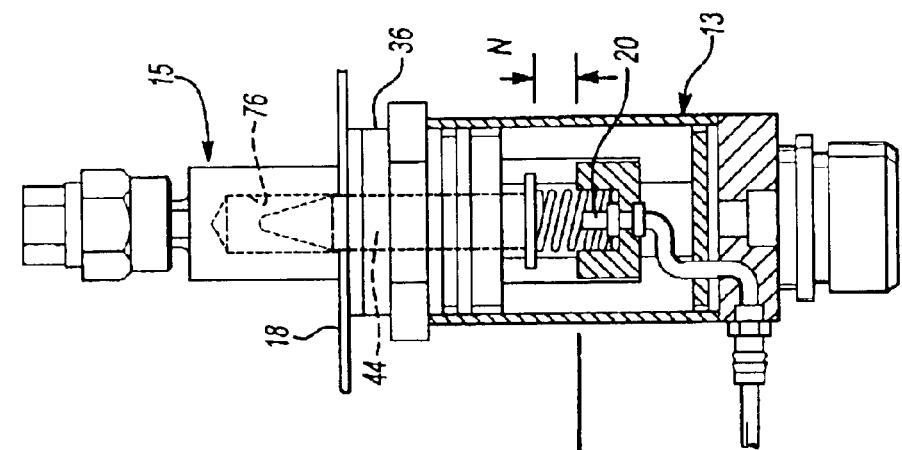
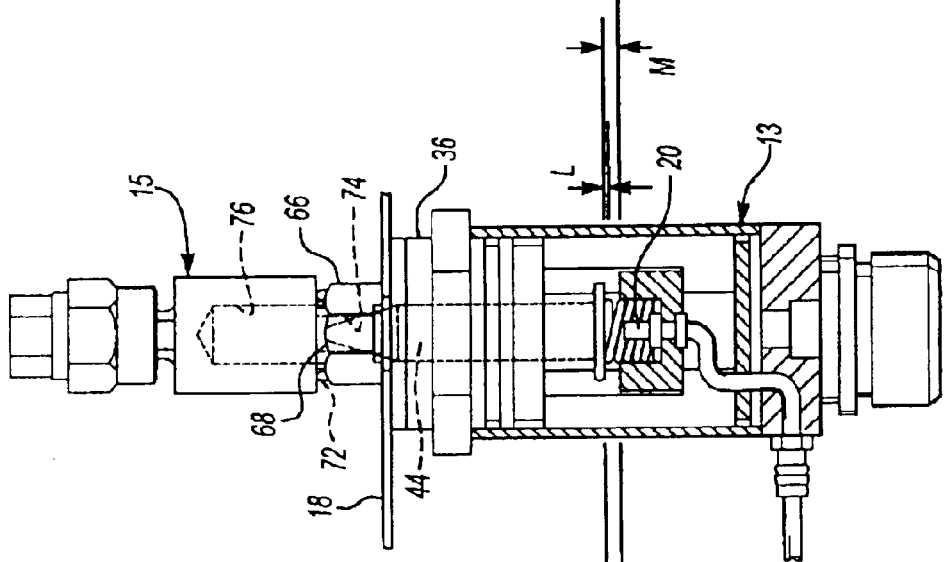
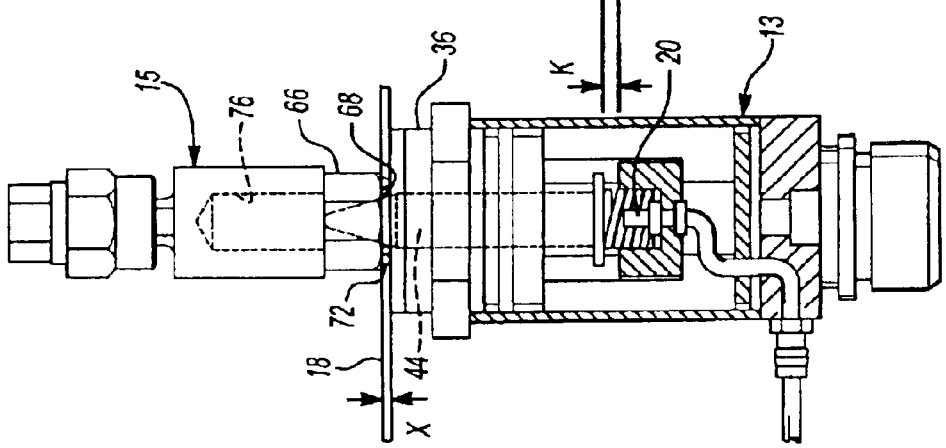

RESISTANCE WELDING FASTENER ELECTRODE

This application is a continuation application of U.S. application Ser. No. 09/902,378 filed Jul. 10, 2001, now U.S. Pat. No. 6,576,859 issued Jun. 10, 2003.

BACKGROUND OF THE INVENTION

This invention relates to a weld gun for resistance welding fasteners to a metallic object, and more particularly, this invention relates to a fastener detection sensor.

Weld gun assemblies are used to resistance weld fasteners to metallic objects such as body panels for vehicles. A fastener such as a weld stud or nut are loaded onto one of the electrodes. The electrodes are moved together with an actuator placing the fastener into engagement with the panel under pressure. Very high currents are applied to the electrodes, which welds the fastener to the panel.

The use of weld guns is typically an automated process in which the fasteners are loaded into the weld gun assembly. Occasionally the fastener is not properly loaded into the weld gun or the fastener may not be loaded into the weld gun at all. Under these circumstances, it is important to detect that there is a problem with the fastener so that the fastener can be properly welded to the panel. To this end, sensors have been used in an effort to determine the presence and orientation of the fastener in the weld gun. Typically, a linear variable displacement transducer has been connected to an electrode arm to measure the movement of the arm. If no nut is present the arm will move a greater amount than if a fastener is present and in the proper orientation. If the fastener is not in the proper orientation, then the electrode arm will move slightly less than if the fastener is in the proper orientation. In this manner, fastener presence and orientation has been detected. However, it has been difficult to accurately detect the proper orientation of the fastener for several reasons. First, the position of the electrode arm does not always correspond to whether the fastener is in the proper orientation. That is, the location of the position sensor cannot detect fastener orientation accurately because of tolerance stack-ups and variations in the fastener. Second, the high electrode currents introduce inaccuracies into the position sensor signal. Even with magnetically shielded cables, enough interference from the electrode current is introduced to give false fastener readings. Therefore, what is needed is a sensor that more accurately detects the orientation and presence of a fastener in a weld gun assembly.

SUMMARY OF THE INVENTION AND ADVANTAGES

The present invention provides a welding assembly for welding a fastener to an object such as a vehicle body panel. The assembly includes a weld gun having first and second electrodes movable relative to one another between an open position and a closed position. The first electrode includes a housing assembly. A pin is received in the housing assembly and is movable when in said closed position between a desired nut position, and upside down nut position, and a no nut position. An optical sensor has a terminal end spaced from the pin for directing light thereon. The terminal end of the sensor receives reflected light from the pin. A sensor control system processes the reflected light into a signal corresponding to one of the desired nut, upside down nut, and no nut positions.

In operation, the pin is inserted into an aperture in the panel. A fastener is loaded onto the pin and the electrodes are moved toward one another about the panel to the closed position. As the electrodes are moved into engagement with the panel, the pin is displaced. The amount of reflected light entering the optical sensor changes with the displacement of the pin. The light from the sensor is sent to an optical amplifier where it is converted to an analog or digital signal. The signal may then be processed to determine whether the fastener is in a desired, upside down or no fastener position.

Accordingly, the present invention provides a sensor that more accurately detects the orientation and presence of a fastener in a weld gun assembly.

BRIEF DESCRIPTION OF THE DRAWINGS

Other advantages of the present invention can be understood by reference to the following detailed description when considered in connection with the accompanying drawings wherein:

FIG. 5 depicts the electrodes in a closed position with a nut in a desired orientation;

FIG. 6 depicts the electrodes in a closed position with the nut in an upside down position; and FIG. 7 depicts the electrodes in the closed position with no nut present.

DETAILED DESCRIPTION OF THE PREFERRED EMBODIMENT

Figure 1:
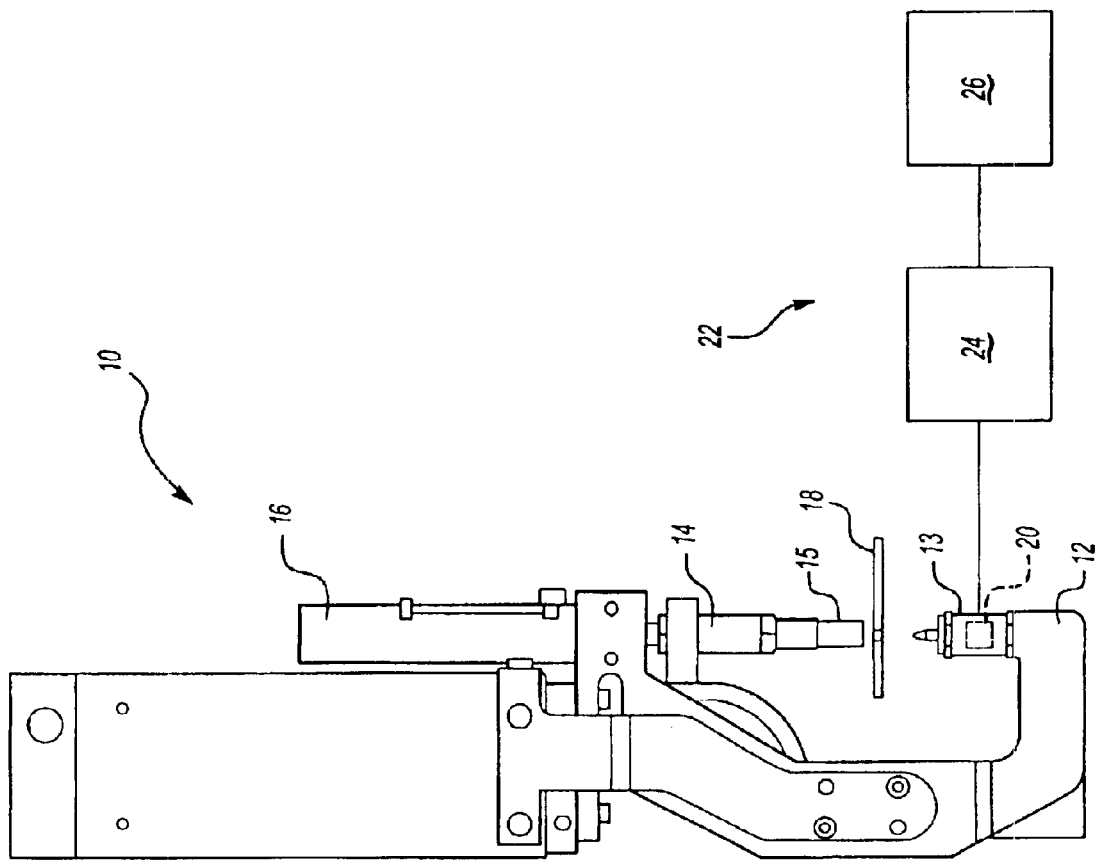
FIG. 1 is a schematic view of a weld gun assembly.

FIG. 1 is a highly schematic view of a weld gun assembly 10. The weld gun assembly 10 includes a lower stationary arm 12 supporting a lower electrode 13. An upper movable arm 14 is connected to the lower arm 12. The upper arm 14 includes an upper electrode 15. An actuator 16 moves the upper arm 14 from an open position (shown) to a closed position in which the electrodes 13 and 15 are in engagement with an object 18 to be welded, such as a vehicle body panel. A fastener such as a weld stud or nut is loaded onto one of the electrodes 13 and 15 and forced into engagement with the object 18. The prior art has detected the presence and orientation of the fastener within the weld gun assembly by detecting the position of the upper arm 14, typically by utilizing a displacement transducer such as an LVDT. The present invention utilizes a position sensor 20 in the lower electrode 13 to detect the position and orientation of the fastener from underneath the object 18. The information from the sensor is sent to a sensor control system 22, which may include an amplifier 24 and a controller 26, which processes the signal into information that may be used to trigger a fault.

While the arms and electrodes are referred to in terms of "upper" and "lower", it is to be understood that the weld gun assembly 10 and its components may be oriented in a manner other than described and remain within the scope of the invention.

Figure 2:
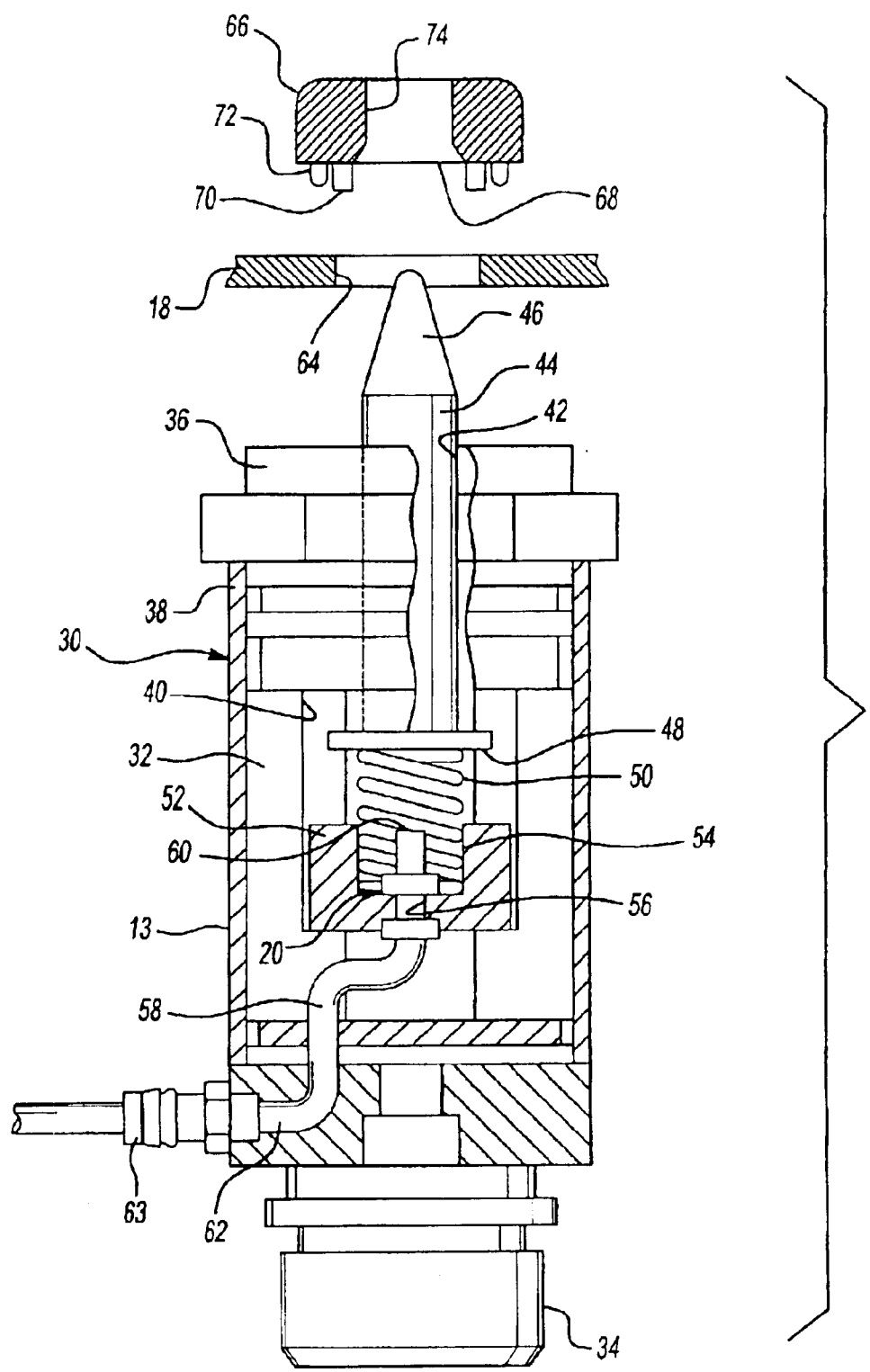
FIG. 2 is a partial cross-sectional exploded view of an electrode and sensor of the present invention.

The lower electrode 13 is shown in greater detail in FIG. 2. The electrode 13 includes a housing assembly 30 having a body 32. The body 32 has an end 34 adapted to be received in the lower arm 12. A weld head 36 is attached to the body 32 opposite the end 34 for applying current to the object 18.

Figure 3:
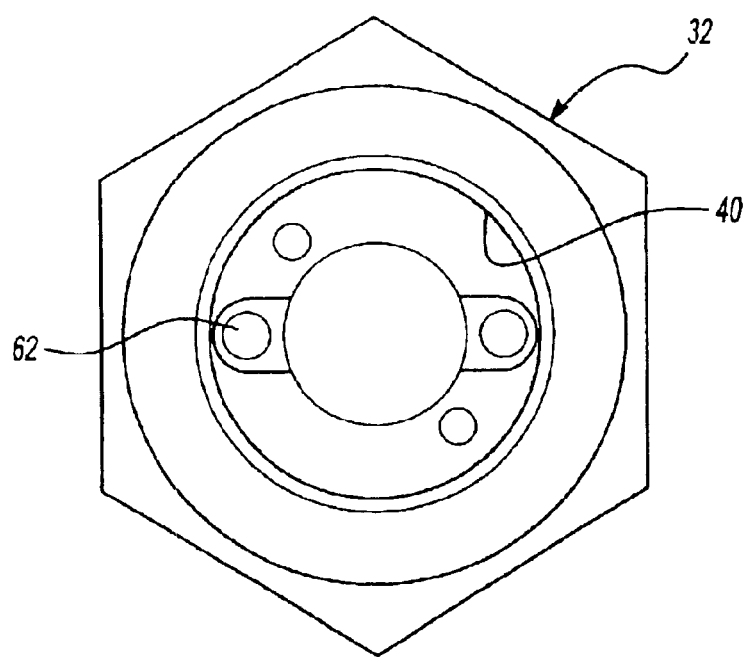
FIG. 3 is a top-elevational view of a body portion of the electrode from FIG. 2.

The housing assembly 30 may further include a shell 38 surrounding the body 32. The body 32 includes a bore 40 (shown in FIG. 3), and the weld head 36 includes an aperture 42 for receiving a pin 44. The body of the pin 44 is housed within the bore 40 and a first end of the pin 46 extends through the aperture 42. The first end 46 is tapered in a manner to receive a fastener such as a nut. However, it is to be understood that the geometry of the pin 44 may be modified to receive a weld stud.

The pin 44 includes a second end 48 opposite the first end 46 which has a flange 48 for preventing the pin 44 from exiting the body 32. A return spring 50 biases the pin 44 toward the upper electrode 15. Pressurized air through the bore 40 may also be used to bias the pin 44.

Figure 4:
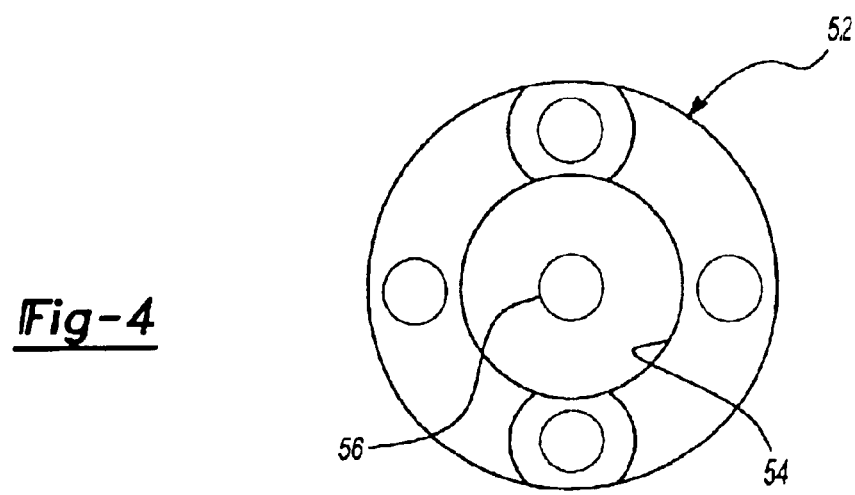
FIG. 4 is a top-elevational view of a sensor mount shown in FIG. 2.

A sensor mount 52 is arranged within the bore 40 and is fastened to the body 32. The sensor mount 52 includes a bore 54 for receiving and locating the spring 50, shown in FIG. 4. A fiber optic cable 58, preferably 3 millimeters in diameter, is fed into the housing assembly 30 and is received within a hole 56 of the sensor mount 52. A terminal end 60 of the cable 58 is arranged proximate to the second end 48 of the pin 44. The fiber optic cable 58 may be fed into the body through an air passage 62 modified to receive an air fitting 63. In this manner, the electrode 13 may be modified slightly to receive the sensor 58 of the present invention. However, it is to be understood that the terminal end 60 may be arranged to be proximate to another portion of the pin 44. Alternatively, the terminal end 60 may be arranged proximate to another weld gun component that is associated with the movement of the pin 44. That is, the terminal end 60 does not necessarily have to be proximate to the pin, but the terminal end 60 tracks the movement of the pin 44.

In operation, the electrodes 13 and 15 are spaced apart from one another in an open position to receive an object 18 to which a fastener is to be welded. The pin 44 is arranged in an aperture 64 of the object 18. A fastener such as a nut 66 is placed onto the first end 46 of the pin 44. The fastener 66 includes a weld face 68 that is in engagement with the object 18. The weld face 68 may include a pilot ring 70 locating the nut 66 within the aperture 64. The weld face 68 further includes protrusions 72 that become molten during the welding process to weld the nut 66 to the object 18. A hole 74 in the nut 66 may include features that cooperate with the end 46 to better locate the nut 66 relative to the object 18. The features on the weld face 68, such as the pilot ring 70 and protrusions 72, are held to very tight tolerances. Position measurements are typically taken with the electrodes 13 and 15 closed about the object 18. The force applied to the object 18 during measurement may be less than the weld force and may be taken before and after the weld to validate the process. By measuring the position of the pin 44, which is in engagement with the weld face side of the nut 66, the pin position will more accurately relate to the nut orientation. Said another way, features of the nut 66 such as the thickness of the nut are not tightly toleranced or controlled. As a result, sensing the orientation of the nut 66 from the upper electrode side, such as by sensing the position of the upper arm as in the prior art, may not accurately correspond to nut orientation due to the larger tolerance.

The fiber optic cable 58 carries light that is directed from the terminal end 60 onto the second end 48. Light is reflected back from the second end 48 back into the fiber optic cable 58. The reflected light is received by the optical amplifier 24 and generates an analog and/or digital signal. The signal is sent to a controller 26 which processes the signal to determine the presence and orientation of the nut 66. The sensor 20 is capable of detecting changes in pin distance 44 to as low as 2 microns. The electrodes 13 and 15 are moved together about the object 18 and nut 66 to a closed position. Pressure is applied to the nut 66 and the object 18 and a current is applied across the electrodes. Protrusions 72 melt in the presence of the high current and weld the nut 66 to the object 18.

FIGS. 5, 6, and 7 respectively depict a nut 66 in a desired position, an upside down nut position, and a no nut position. The upper electrode 15 includes a bore 76 for receiving a portion of the pin 44. Referring to FIG. 5, the nut 66 is shown in a desired position in which the weld face 68 is adjacent to the object 18. The object 18 has a material thickness X. The pin 44 is displaced as the electrodes 13 and 15 are closed together. In this position, the pin 44 may be displaced from the sensor 20 by a distance K, which may be 0.1115 inch for a particular nut. The sensor control system 22 would be calibrated to indicate a distance K as a correct nut orientation. Furthermore, while it is appreciated that the electrodes 13 and 15 will wear over time the electrode wear, which is predictable, may be compensated for over its life. The electrode wear for the present invention is less than the prior art, since the lower electrode wears at about $\frac{1}{10}$ the rate than the upper electrode, which is where prior art measurements have taken place.

Referring to FIG. 6, the nut is in an upside down position in which the weld face 68 is spaced from the object. In this position, the nut 66 cannot be welded to the object 18 as the protrusion 72 are not in engagement with the object. In the upside down nut position, the pin 44 is received differently within the hole 74 in the nut such that the distance between the pin 44 and the sensor 20 is a distance M, which may be 0.1225 inch for the nut 66. As can be appreciated, the difference between the desired nut position and the upside down nut position is relatively small distance L, only 0.0110 inch. Accordingly, it is critical that the sensor 22 be able to accurately detect the orientation of the nut. By utilizing fiber optics, which is impervious to magnetic field interference generated by the weld gun current, an accurate pin position may be detected. Moreover, since the pin engages the nut 66 from the underside of the nut near the object 18, variations in nut thickness will not impact the accuracy of the sensor. The pin end 46 may engage a chamber in the hole 76, as shown in FIG. 2. If the nut is upside-down the side without the chamber will depress the pin 44 more, which make an upside-down nut orientation easier to detect.

Referring to FIG. 7, a no nut position is shown. The pin 44 is spaced from the sensor 20 a distance of N, which may be 0.3489 inch for the nut 66.

Presently, available lower electrodes 13 may be modified to accommodate the sensor 20 of the present invention. The sensor 20 has the advantages of being contained within the electrode 13 where it is protected from the harsh welding environment. The sensor 20 is somewhat tolerant to contamination. Although the present invention sensor 20 is discussed in terms of an optical sensor, it is to be understood that more conventional sensors, such as LVDTs may be used to detect pin position, however, optical sensors have the advantages discussed above.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of resistance welding a fastener comprising the steps of:
   a) loading a fastener onto a pin;
   b) closing opposing weld gun electrodes about an object;
   c) displacing the pin; and
   d) measuring a weld gun component associated with movement of the pin.

2. The method according to claim 1, wherein the weld gun component is the pin.

3. The method according to claim 1, preceding step a) including the step of inserting the pin into an aperture in the object.

4. The method according to claim 1, including the step of indicating one of a desired nut position, upside down nut position, and no nut position for the pin displacement.

5. The method according to claim 4, including the step of generating a weld gun fault for the upside down nut and no nut positions.

6. A method of resistance welding a fastener comprising the steps of:
   a) loading a fastener onto a pin;
   b) closing opposing weld gun electrodes about an object;
   c) axially displacing the pin relative to a body that houses the pin; and
   d) measuring the displacement of the pin.

7. The method according to claim 6, wherein step d) includes directly measuring movement of the pin.

8. The method according to claim 6, wherein step d) includes measuring a weld gun component associated with movement of the pin.

9. The method according to claim 6, including the step of indicating one of a desired nut position, upside down nut position, and no nut position for the pin displacement, step c) beginning once one of the opposing electrodes has engaged a nut on the pin during step b) thereby creating electrical contact between the opposing electrodes.

10. The method according to claim 9, including the step of generating a weld gun fault for the upside down nut and no nut positions.

11. The method according to claim 6, wherein one of the opposing electrodes provides the housing and the pin, the pin stationary relative to the body during at least a portion of step b).

12. A method of resistance welding a fastener comprising the steps of:
   a) loading a fastener onto a pin;
   b) closing opposing weld gun electrodes about an object, the pin stationary during at least a portion of step b);
   c) displacing the pin; and
   d) measuring a weld gun component indicative of movement of the pin.

* * * * *